United States Patent [19]

Henzl

[11] 4,043,727
[45] Aug. 23, 1977

[54] O-RING MOLD

[75] Inventor: Jerry Henzl, Crystal Lake, Ill.

[73] Assignee: Crane Packing Company, Morton Grove, Ill.

[21] Appl. No.: 682,743

[22] Filed: May 3, 1976

[51] Int. Cl.² .............................................. B29F 1/00
[52] U.S. Cl. ........................... 425/578; 425/DIG. 47; 249/105
[58] Field of Search .............. 425/DIG. 42, DIG. 47, 425/242 R, 251; 264/DIG. 67

[56] References Cited

U.S. PATENT DOCUMENTS

| | | | |
|---|---|---|---|
| 3,063,097 | 11/1962 | Jutzi | 425/DIG. 47 |
| 3,095,611 | 7/1963 | Borah | 425/DIG. 47 |
| 3,241,845 | 3/1966 | Smith et al. | 425/DIG. 47 |
| 3,270,373 | 9/1966 | Jagger et al. | 425/DIG. 47 |
| 3,536,806 | 10/1970 | Jackson | 425/DIG. 47 |

Primary Examiner—Robert L. Spicer, Jr.
Attorney, Agent, or Firm—Haight, Hofeldt, Davis and Jambor

[57] ABSTRACT

A mold for forming O-ring seals free of flash at their inside and outside diameters. The mold includes a first mold section having a frustrum extending from a surface thereof and a second mold section having a cavity for receiving said frustrum, said frustrum and recess having annular grooves juxtaposed to define a mold cavity for an O-ring seal. Mating surfaces of the frustrum and recess act to seal one side of the cavity while spaced surfaces on the opposite side of the cavity define an annular orifice extending into said mold cavity. The mold further includes a loading chamber and means for injecting a seal composition through said orifice into said mold cavity for curing.

8 Claims, 8 Drawing Figures

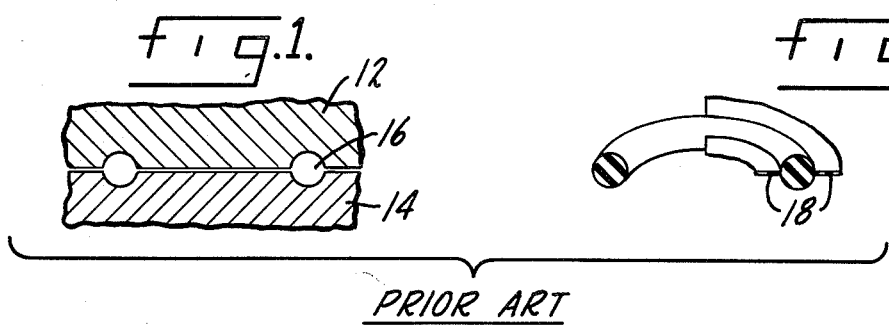
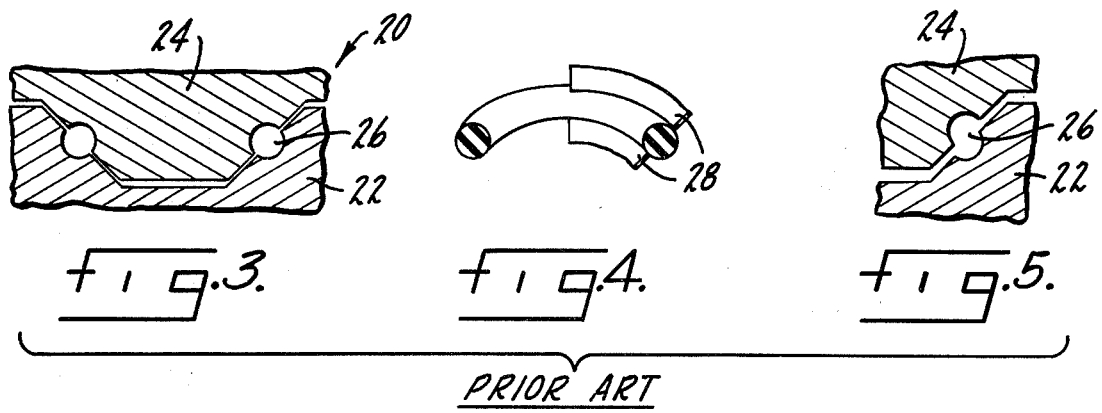
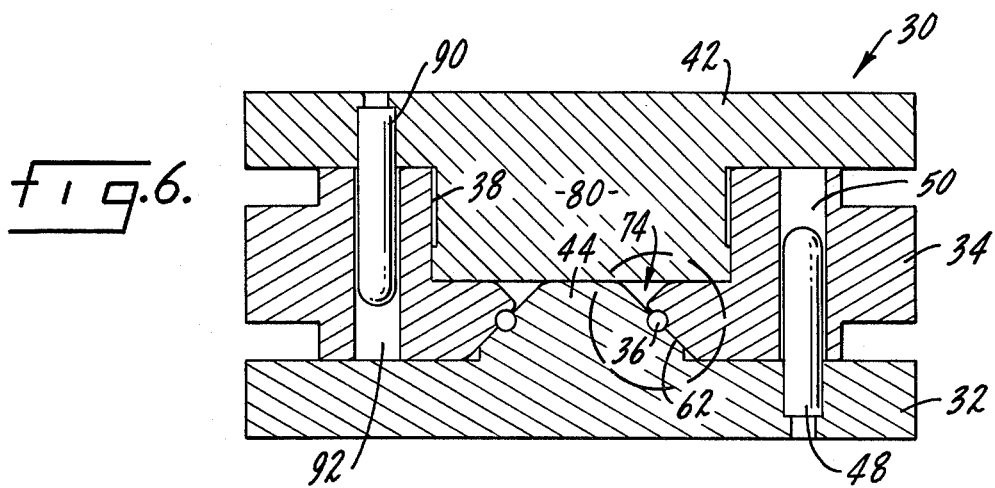
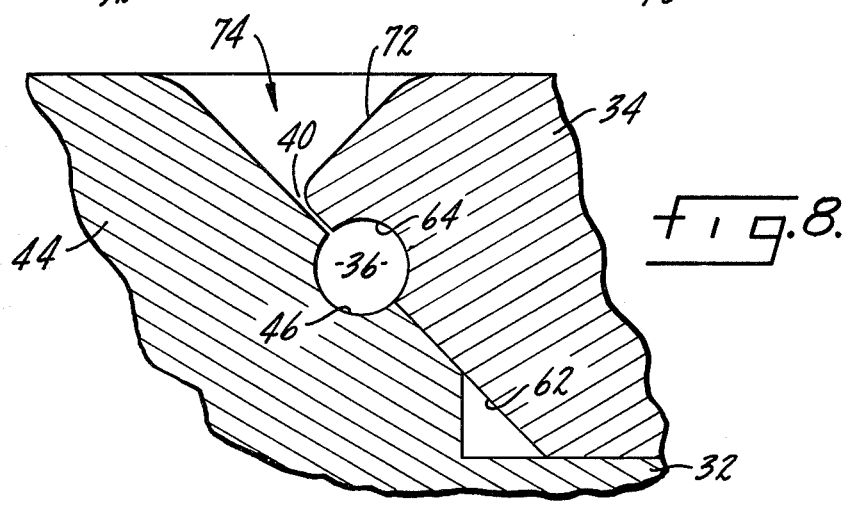

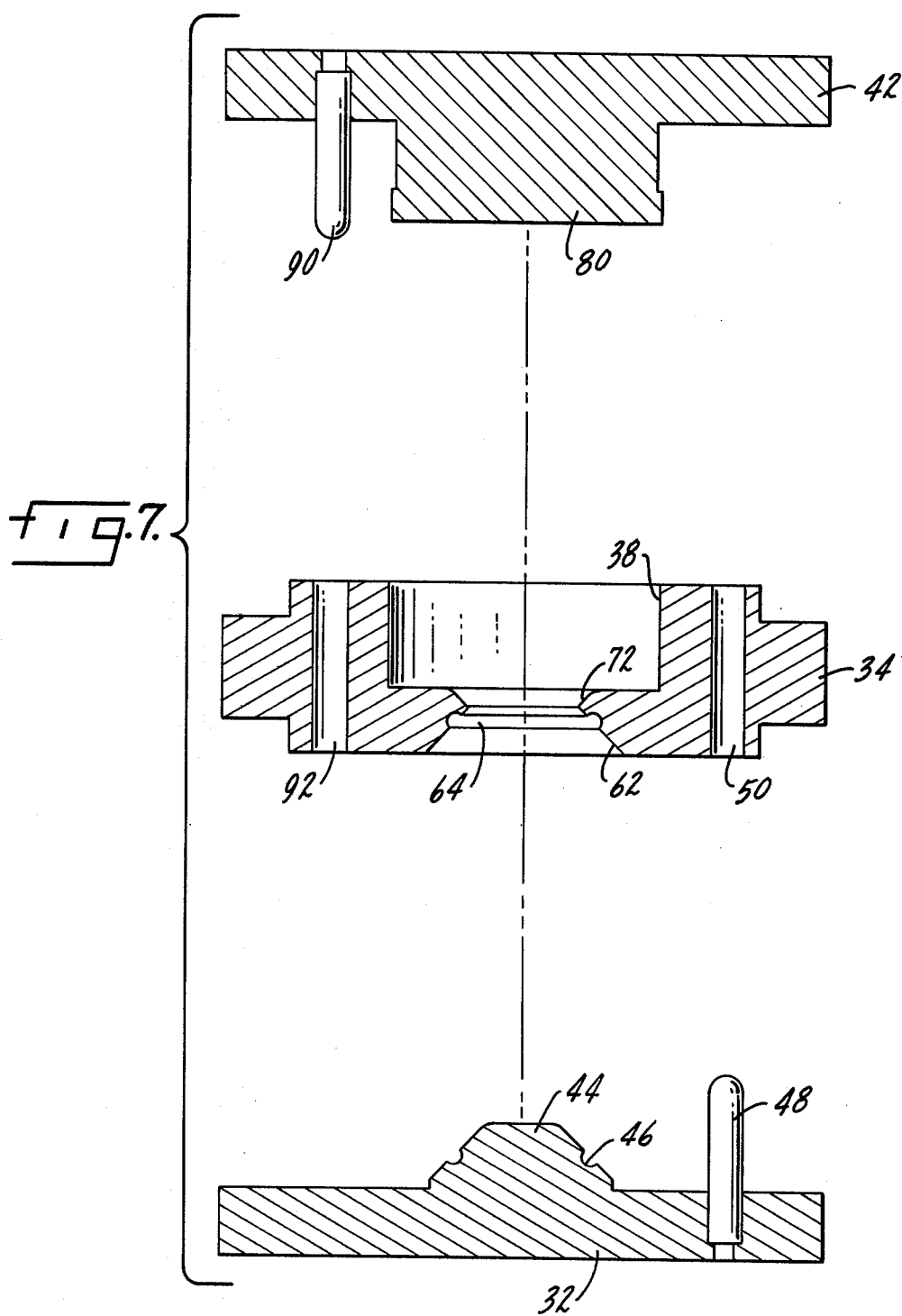

O-RING MOLD

BACKGROUND OF THE INVENTION

This invention relates to a mold for making elastomeric O-ring seals. More specifically, it relates to a mold defining an O-ring cavity in which the mold sections have parting lines positioned at a 45° angle from a plane passing through the inside and outside diameters of the O-ring.

A conventional prior art mold is illustrated in FIG. 1 of the drawings and comprises an upper mold half 12 and a lower mold half at 14, which, in mating relationship, define the O-ring annular cavity 16. In the manufacture of O-rings, an excess amount of elastomeric material is placed upon the lower mold half, with the upper mold half being brought downwardly under substantial force to compress most of the material into the cavity 16. The excess material is merely compressed between the mold halves and upon curing, extends as flash 18 around the inside and outside diameters of the O-ring depicted in FIG. 2. Unfortunately, the inside and outside diameters are usually the critical sealing surfaces of the O-ring and require that the flash be removed. Various methods have been developed for removing the flash and include tumbling in dry ice; machine trimming, and other methods. Such removal may result in tolerance problems and adverse effects upon the sealing surface.

To overcome these problems, the prior art has suggested the manufacture of an O-ring in which the flash is displaced from the inside and outside diameters of the O-ring. In an article entitled "Sealing Points Free of Flash Eliminate Packing Ring Leakage," appearing in the Aug. 2, 1945, issue of American Machinists, Mr. Harry Wessel not only suggested the desirability of such an O-ring, but also set forth a mold for its manufacture. This mold 20 (depicted in FIG. 3) included a lower mold half 22 having a frustoconical recess and an upper mold half 24 having a mating projection, the inclined surfaces defining a mold cavity 26. The O-ring formed in this mold 20 is depicted in FIG. 4 and has flash 28 extending in a 45° angle from a plane passing through the internal and outside diameters of the O-ring.

Use of the mold at FIG. 3 in conjunction with compression molding techniques may still result in undesirable O-rings. Though the flash at the I.D. and O.D. has been eliminated, an excess amount of seal composition may preclude the mold halves of 22 and 24 from fully seating, thus resulting in an O-ring having an out-of-round cross-section as depicted in FIG. 5.

SUMMARY OF THE INVENTION

In order to provide an O-ring which is free of flash at its inside and outside diameters, and to avoid the problem of O-rings having out-of-round cross-sections, the instant invention relates to a mold having a parting line at a 45° angle with a plane passing through the inside and outside diameters of the seal and which will fully seat to insure an annular cavity cross-section. The invention includes a first mold section having a frustrum extending from one surface thereof and a second mold half having a recess therein for receiving the frustrum. Formed upon the surface of the recess and the frustrum are grooves which, upon seating of the molds, defines the O-ring cavity. On one side of the cavity, the surfaces of the frustrum and recess mate in sealing arrangement while on the other side, the surfaces are spaced to define an annular orifice through which a seal composition may be compressed and transferred into the cavity. Communicating with the orifice, is a loading chamber which receives a plunger to force each load of seal material through the orifice and into the cavity.

Accordingly, it is the object of my invention to provide a mold for an O-ring seal which eliminates seals having non-annular cross-sections and flash at the inside and outside diameters of the O-ring. Another object of my invention is to provide a specific mold construction for use in transfer and injection molding processes in which the seal composition is precluded from interfering with full, complete seating of the mold halves, eliminating any mismatch problem. Another object is to provide a simple three-piece mold which provides excellent knitting of the seal composition into a homogeneous seal and which eliminates flash otherwise occurring on one side of the seal.

DESCRIPTION OF THE DRAWING

The manner in which these and other objects of the instant invention are attained will be disclosed in the following specifications and drawings in which:

FIG. 1 is a side elevation view in section of a conventional mold for the manufacture of O-rings;

FIG. 2 is a perspective view of a conventional O-ring as formed in the mold of FIG. 1 and having flash at its inside and outside diameters;

FIG. 3 is a side elevational view in section of a mold depicted in the American Machinists Magazine referred to above;

FIG. 4 is a perspective view of an O-ring formed in the mold of FIG. 3;

FIG. 5 is an elevational view in section of the mold of FIG. 3 depicting imperfect seating of the mold upon closing, and the out-of-round O-ring formed therein;

FIG. 6 is an elevational view in section of a preferred embodiment of my invention taken along a plane passing through its center;

FIG. 7 is an exploded elevational view in section of the mold depicted in FIG. 6; and FIG. 8 is an enlarged view of a portion of the mold depicted in the circle of FIG. 6.

DETAIL DESCRIPTION

With reference to FIG. 6, the mold 30 of a preferred embodiment includes a stationary bottom section or plate 32 which receives, in mating relation, a center section 34 to define an O-ring mold cavity 36. A seal composition is transferred into this cavity 36 from an annular loading or pressure chamber 38 through an annular orifice 40 by the force of a plunger plate 42. Thus, the center plate 34 and plunger plate 42 are mounted for movement relative to the bottom plate 32 and to each other by a press apparatus (not shown) which is well within the skill of the art.

The details of this preferred embodiment is more clearly depicted in FIG. 7 and 8. With reference to the bottom plate 32, such may be square, annular or rectangular and may include a plurality of cavities 36, identical to that depicted in the drawing. This cavity is formed by frustoconical projection 44 extending upwardly from the upper surface of the plate 32, the side walls of the section being formed at an angle of, preferably, 45 degrees to the surface of plate 32. At the median of the frustoconical projection 44 is an annular groove 46 circumscribing the frustrum so as to define one-half of the mold cavity having an annular cross-section. Transversely displaced from the projection 44 is a plurality of leader pins 48 which extend upwardly into apertures 50 to guide the center plate 34 in its downward travel. This center plate 34 has the same general external dimensions as the bottom plate, and on its lower surface has a recess 62 designed to mate with projection 44 in a manner subsequently to be described. Machined into the surface of this recess 62 is another groove 64 which mates with the groove 46 of projection 44 when the center plate 32 and the bottom plate 34 are in the closed, seated relationship of FIG. 6.

With particular attention to FIG. 8, and in accordance with my invention, the mating surfaces of the projection 44 and of the recess 62 below the cavity 36 are machined so as to seat in sealed relationship, avoiding a flash on the lower portion of the O-ring to be formed in cavity 36. Above the cavity 36, however, these mating surfaces are ground to define the annular orifice 40 extending circumferentially above the cavity 36. Furthermore, the center plate 34 is provided with a reverse cut 72 which, in conjunction with the upper portion of the projection 44 defines an aperture 74 to channel seal composition through the orifice 40 and into the cavity 36.

The composition (not shown) is forced through the aperture 74 and orifice 40 from a loading chamber 38 which preferably takes the shape of an annular recess on the upper surface of the center plate 34. This annular recess receives a plunger 80 which extends downwardly from the plunger plate 42 to extend into the chamber 38 in mating relationship. Preferably, the design of the mold is such that the surface area of the plunger 80, as well as the recess 38, is approximately 1.2 times the area circumscribed by the outside diameter of the O-ring cavity 36. Such a dimensional relationship precludes the seal composition from unseating the mold under the pressure of the plunger. In addition, it is suggested that several leader pins 90 extend from the plunger plate 42 into apertures 92 of the center plate for initially guiding the plunger into its operative position.

MODE OF OPERATION

In utilizing the preferred embodiment of my invention to form O-rings, the bottom plate 32 is preferably fixed to a stationary surface of the press, with the center plate 34 and the plunger plate 42 being moved relative thereto and to each other. Starting with the mold in the fully open position, the center plate is first sealed upon the bottom plate, the leader pins 48 initially guiding the center plate downwardly while the ground surfaces of the frustrum of the projection 44 and the recess 62 center the parts relative to one another and placing same in a sealed position to define an annular O-ring cavity 36. Subsequently, a load or plug of elastomeric material is placed into the cavity 38. This load may take the form of a strip of seal composition laid about the circumference of the aperture 74. Subsequently, the plunger is lowered under force to compress the composition through the orifice 40. Alternatively, the orifice 40 and loading chamber 38 might be positioned on the opposite side of the O-ring cavity 36. Additionally, the mold of my invention may be used for injection molding. This would involve the closing of the center section 34 upon the lower plate 32. Then, a source of pressurized seal composition is interconnected through a sprue to the orifice 40 for injection into cavity 36. In this construction, the plunger 80 and cavity 36 are eliminated by an extruder or other injection molding device. Similarly, in this instance, the center section may be fixed, while plate 32 reciprocates relative thereto.

I claim:

1. A mold for forming ring seals free of flash at their internal and external diameters comprising:
    a. a first plate having at least one frustrum extending from a surface thereof; said frustrum having a circumferential groove formed therein to generally define one-half of a mold cavity for a ring seal;
    b. a second plate having a recess for receiving said frustrum, said second plate having a circumferential groove therein extending about said recess to generally define another half of a mold cavity;
    c. said frustrum and recess having mating surfaces on one side of said cavity to seal said cavity, and spaced surfaces on the opposite side of said cavity to define a ring-shaped orifice; and
    d. plunger means for injecting a seal composition through said orifice into said cavity.

2. An apparatus, as recited in claim 1, in which said cavity is annular to define an O-ring mold cavity.

3. An apparatus, as recited in claim 1, in which said means for injecting said seal composition comprises
    a. a plunger plate; and
    b. a loading and pressure recess connected to said orifice and formed in said center plate for receiving said seal composition and said plunger for injecting said composition through said orifice into said mold cavity.

4. An apparatus, as recited in claim 3, in which said loading and pressure recess and said frustrum define a ring-shaped aperture interconnected with said orifice for directing said seal composition into said orifice and cavity.

5. A mold for forming elastomeric seals free of flash at their internal and outside diameters comprising:
    a. a mold plate having at least one frustoconical projection thereon;
    b. a second mold plate having a frustoconical recess therein for matingly receiving said projection, and a loading chamber connected to said recess;
    c. said projection and recess defining an O-ring cavity when placed in mating relation;
    d. an annular orifice defined by the circumference of said projection and recess extending from adjacent the top of said projection into said cavity; and
    e. a plunger means for extending into said loading chamber for forcing a seal composition through said orifice into said cavity.

6. An apparatus, as recited in claim 5, in which said plunger has a cross-sectional area which is at least 1.2 times as large as the outside diameter of said O-ring cavity.

7. A self-centering mold for producing ring type seals without flash at their inside and outside diameters comprising:
    a. a first mold section having a frustrum extending therefrom;
    b. a second mold section having a recess for receiving said frustrum; said frustrum and recess further defining a ring seal cavity;
    c. said recess and frustrum mating in sealing engagement on one side of said cavity and defining a circumferential orifice about said frustrum on the opposite side of said cavity;
    d. plunger means for injecting a seal composition through said orifice into said cavity.

8. A mold for forming an O-Ring seal comprising:

a. a first section having a flat surface and a frustoconical section extending upwardly there from, said section having a semicircular grove therein for defining one half of the O-Ring cavity;
b. a second section having a flat surface and an aperture therein for receiving said frustonconical section, a wall of said section within said aperture having a semicircular grove therein for mating with said grove in said frustoconical section to define an O-Ring cavity;
c. the walls of said projection and aperture on one side of said cavity having mating surfaces to seal said cavity, and spaced surfaces on the opposite side of said cavity to define an annular orifice extending into said O-Ring cavity;
d. guide means for guiding said sections into and out of mating relation; and
e. pressure means for forcing a seal composition through said annular orifice.

* * * * *